(12) United States Patent
Lin (10) Patent No.: US 11,892,158 B2
(45) Date of Patent: Feb. 6, 2024

(54) LIGHT SOURCE MODULE

(71) Applicant: DELTA ELECTRONICS, INC., Taoyuan (TW)

(72) Inventor: Chih-Hao Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/934,579

(22) Filed: Sep. 23, 2022

(65) Prior Publication Data
US 2024/0011620 A1  Jan. 11, 2024

(30) Foreign Application Priority Data
Jul. 7, 2022  (CN) .......................... 202210802731.2

(51) Int. Cl.
*F21V 9/30* (2018.01)
*G02B 27/10* (2006.01)
*G02B 19/00* (2006.01)
*F21Y 115/30* (2016.01)

(52) U.S. Cl.
CPC ............ *F21V 9/30* (2018.02); *G02B 19/0057* (2013.01); *G02B 27/10* (2013.01); *F21Y 2115/30* (2016.08)

(58) Field of Classification Search
None
See application file for complete search history.

(56) References Cited

U.S. PATENT DOCUMENTS
2017/0163947 A1  6/2017  Chang et al.

FOREIGN PATENT DOCUMENTS

| CN | 108781279 A | | 11/2018 |
|---|---|---|---|
| JP | 2020106692 A | * | 7/2020 |
| TW | 201721274 A | | 6/2017 |

* cited by examiner

*Primary Examiner* — Bao-Luan Q Le
*Assistant Examiner* — Danell L Owens
(74) *Attorney, Agent, or Firm* — CKC & Partners Co., LLC (57) ABSTRACT

A light source device includes first and second laser light sources, a wavelength conversion unit, a light condensing module, a light combining member, and light guiding members. The first laser light source is configured to emit a first light beam along a first axis. The second laser light source is arranged along the second axis with the first laser light source and configured to emit a second light beam along the first axis. The wavelength conversion unit is configured to convert the second light beam into a color light. The condensing module is configured to condense the color light. The light combining member is configured to receive the first light beam and the color light. The light guiding members are configured to guide at least one of the first light beam and the color light.

20 Claims, 7 Drawing Sheets

LIGHT SOURCE MODULE

CROSS-REFERENCE TO RELATED APPLICATION

This application claims priority to China Application Serial Number 202210802731.2, filed Jul. 7, 2022, which is herein incorporated by reference.

BACKGROUND

Technical Field

The present disclosure relates to a light source device.

Description of Related Art

In recent years, laser light has attracted attention as a light source of projection-type image display devices. Laser light sources have several advantages. First, the laser light emitted from the laser light source has excellent directivity and thus has high optical utility. In addition, the laser light is monochromatic, so the color reproduction area can be enlarged. Laser light sources also feature low power consumption and long life compared to other light sources such as incandescent light bulbs.

Most of the current projectors using laser light source modules use two ways to form the desired color of the screen. The first way is to irradiate the fluorescent wheel with a blue laser beam, thereby exciting to produce yellow, green and red light. However, the fluorescent wheel is a moving part, so it is easy to cause system vibration, noise, and other unstable factors. The second way is to directly use the red laser light source, the green laser light source, and the blue laser light source. However, the prices of the red laser light source and the green laser light source are higher than that of the blue laser light source, which makes the system cost higher.

Accordingly, how to provide a light source device that can solve the aforementioned problems becomes an important issue to be solved by those in the industry.

SUMMARY

An aspect of the disclosure is to provide a light source device that can efficiently solve the aforementioned problems.

According to an embodiment of the disclosure, a light source device includes a first laser light source, a second laser light source, a first wavelength conversion unit, a light condensing module, a light combining member, and a plurality of light guiding members. The first laser light source is configured to emit a first light beam along a first axis. The first light beam has a first central optical axis. The second laser light source is arranged along a second axis with the first laser light source and configured to emit a second light beam along the first axis. The first wavelength conversion unit is configured to convert the second light beam into a color light. The light condensing module is configured to condense the color light. The color light which is condensed has a second central optical axis. The light combining member is configured to receive the first light beam and the color light. The light guiding members are configured to guide at least one of the first light beam and the color light, so that the first central optical axis and the second central optical axis coincide before the first light beam and the color light reach the light combining member.

In an embodiment of the disclosure, the first laser light source and the second laser light source are disposed on a circuit board and electrically connected to the circuit board.

In an embodiment of the disclosure, the light guiding members include a first light guiding member and a second light guiding member. The first light guiding member and the second light guiding member are configured to sequentially guide one of the first light beam and the color light.

In an embodiment of the disclosure, the second light guiding member is configured to allow another of the first light beam and the color light to pass through. The first central optical axis and the second central optical axis coincide after passing through the second light guiding member.

In an embodiment of the disclosure, the light guiding members include a first light guiding member and a second light guiding member. The first light guiding member is configured to guide the first light beam. The second light guiding member is configured to guide the color light.

In an embodiment of the disclosure, the second light guiding member is configured to guide the color light to the first light guiding member. The first light guiding member is further configured to allow the color light to pass through. The first central optical axis and the second central optical axis coincide after passing through the first light guiding member.

In an embodiment of the disclosure, the light guiding members further include a third light guiding member and a fourth light guiding member. The third light guiding member is configured to guide the first light beam from the first light guiding member. The fourth light guiding member is configured to guide the color light from the second light guiding member. The first central optical axis and the second central optical axis coincide after respectively passing through the third light guiding member and the fourth light guiding member.

In an embodiment of the disclosure, the light source device further includes a third laser light source and a second wavelength conversion unit. The third laser light source is arranged along the second axis with the first laser light source and is configured to emit a third light beam along the first axis. The second wavelength conversion unit is configured to convert the third light beam into another color light. The light condensing module is further configured to condense the another color light, so that the condensed another color light has a third central optical axis. The light guiding members are configured to guide at least two of the first light beam, the color light, and the another color light, so that the first central optical axis, the second central optical axis, and the third central optical axis coincide before the first light beam, the color light, and the another color light reach the light combining member.

In an embodiment of the disclosure, the first laser light source, the second laser light source, and the third laser light source are disposed on a circuit board and electrically connected to the circuit board.

In an embodiment of the disclosure, the light guiding members comprises a first light guiding member, a second light guiding member, and a third light guiding member that are respectively configured to guide the first light beam, the color light, and the another color light.

In an embodiment of the disclosure, the third light guiding member is configured to guide the another color light to the second light guiding member. The second light guiding member is configured to guide the color light to the first light guiding member and further configured to allow the another color light to pass through. The first light guiding member is further configured to allow the color light and the another color light to pass through. The first central optical axis, the second central optical axis, and the third central optical axis coincide after passing through the first light guiding member.

In an embodiment of the disclosure, the light guiding members include a first light guiding member, a second light guiding member, a third light guiding member, and a fourth light guiding member. The first light guiding member and the third light guiding member are configured to sequentially guide a first one of the first light beam, the color light, and the another color light. The second light guiding member and the fourth light guiding member are configured to sequentially guide a second one of the first light beam, the color light, and the another color light. The third light guiding member and the fourth light guiding member are further configured to allow a third one of the first light beam, the color light, and the another color light to pass through.

In an embodiment of the disclosure, the first laser light source, the second laser light source, and the third laser light source are blue laser light sources.

In an embodiment of the disclosure, the second laser light source is configured to emit the second light beam toward a side of the first wavelength conversion unit. The color light propagates away from the first wavelength conversion unit from another side of the first wavelength conversion unit.

In an embodiment of the disclosure, the first wavelength conversion unit is located between the second laser light source and the light condensing module.

In an embodiment of the disclosure, the second laser light source is configured to emit the second light beam toward a side of the first wavelength conversion unit. The color light propagates away from the first wavelength conversion unit from the side of the first wavelength conversion unit.

In an embodiment of the disclosure, the light condensing module is located between the second laser light source and the first wavelength conversion unit.

In an embodiment of the disclosure, the light source device further includes a light reflecting member which is disposed at another side of the first wavelength conversion unit.

In an embodiment of the disclosure, the light source device further includes a diffusion sheet. The first laser light source is configured to emit the first light beam toward the diffusion sheet.

In an embodiment of the disclosure, the first laser light source and the second laser light source are blue laser light sources.

Accordingly, in the light source device of the present disclosure, the first light beam emitted by the first laser light source does not pass through the first wavelength conversion unit, while the second light beam emitted by the second laser light source passes through the first wavelength conversion unit to be converted into color light. Then, the diffused color light is condensed by the light condensing module, and the first light beam and the color light are combined by the light combining member to obtain the white light. In this way, the light source device of the present disclosure can omit the conventional fluorescent wheel, thus has a smaller volume and can avoid vibration, noise, and other unstable factors caused by the fluorescent wheel. Not only that, the light source device of the present disclosure can also avoid using high-priced red laser light sources and green laser light sources, thereby reducing costs.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
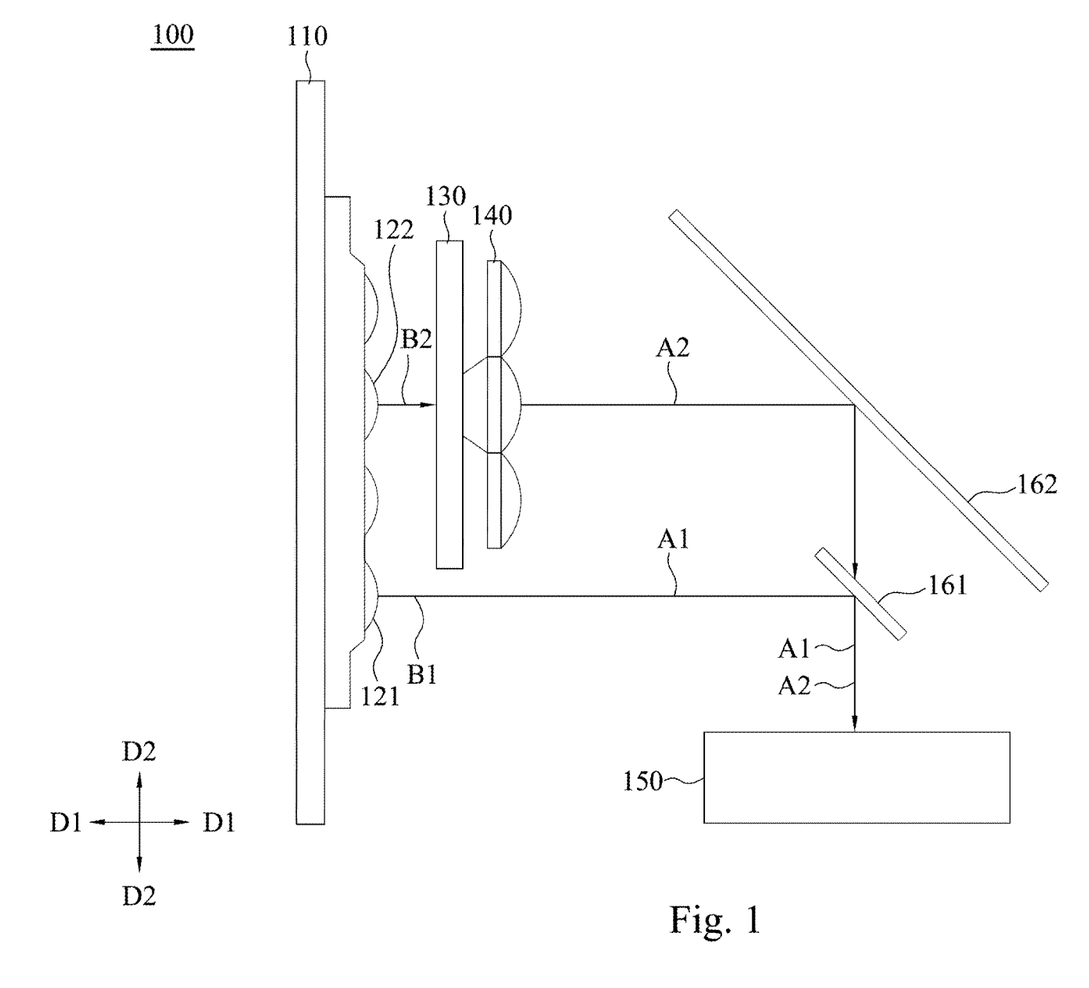
FIG. 1 is a schematic diagram of a light source device according to an embodiment of the present disclosure.

Reference is made to FIG. 1. FIG. 1 is a schematic diagram of a light source device 100 according to an embodiment of the present disclosure. As shown in FIG. 1, in the present embodiment, the light source device 100 may be applied to, for example, a three-chip digital light processing (DLP) projector, but the present disclosure is not limited in this regard. The light source device 100 includes a plurality of laser light sources and a wavelength conversion unit 130. Specifically, the laser light sources include a first laser light source 121 and a second laser light source 122. The first laser light source 121 is configured to emit a first light beam B1 along a first axis D1. The first light beam B1 has a first central optical axis A1. The second laser light source 122 is arranged along the second axis D2 with the first laser light source 121 and configured to emit a second light beam B2 along the first axis D1. The wavelength conversion unit 130 is configured to convert the second light beam B2 into a color light. Specifically, the second laser light source 122 is configured to emit the second light beam B2 toward a side of the wavelength conversion unit 130 (e.g., the left side of the wavelength conversion unit 130 in FIG. 1). The color light propagates away from the wavelength conversion unit 130 from another side of the wavelength conversion unit 130 (e.g., the right side of the wavelength conversion unit 130 in FIG. 1).

In some embodiments, the laser light sources are disposed on a circuit board 110 and electrically connected to the circuit board 110. In some embodiments, the laser light sources disposed on the circuit board 110 are identical laser light sources. For example, the laser light sources disposed on the circuit board 110 are all blue laser light sources, but the present disclosure is not limited in this regard.

In some embodiments, the first light beam B1 emitted by the first laser light source 121 and the second light beam B2 emitted by the second laser light source 122 are blue laser beams, and the second light beam B2 is converted by the wavelength conversion unit 130 to the color light which is yellow light, but the present disclosure is not limited in this regard.

In some embodiments, the first axis D1 and the second axis D2 are perpendicular to each other, but the present disclosure is not limited in this regard.

As shown in FIG. 1, in the present embodiment, the light source device 100 further includes a light condensing module 140, a light combining member 150, and a plurality of light guiding members. The wavelength conversion unit 130 is located between the second laser light source 122 and the light condensing module 140. The light condensing module 140 is configured to condense the color light. In this way, the divergent color light leaving the wavelength conversion unit 130 can be condensed into a light beam by the light condensing module 140, thereby reducing light loss. Specifically, the light condenser module 140 includes a plurality of condensing lenses corresponding to a plurality of laser light sources respectively. The color light which is condensed has a second central optical axis A2. The light combining member 150 is configured to receive the first light beam B1 and the color light. For example, the light combining member 150 is an integrating rod. The light guiding members are configured to guide at least one of the first light beam B1 and the color light, so that the first central optical axis A1 and the second central optical axis A2 coincide before the first light beam B1 and the color light reach the light combining member 150.

In some embodiments, the condensing lenses of the light condensing module 140 are collimating lenses, but the present disclosure is not limited in this regard.

As shown in FIG. 1, in the present embodiment, the light guiding members include a first light guiding member 161 and a second light guiding member 162. The first light guiding member 161 is configured to guide the first light beam B1. The second light guiding member 162 is configured to guide the color light. In detail, the second light guiding member 162 is configured to reflect the color light to the first light guiding member 161. The first light guiding member 161 is further configured to allow the color light to pass through and reflect the first light beam B1. The first central optical axis A1 and the second central optical axis A2 coincide after passing through the first light guiding member 161.

In some embodiments, the first light guiding member 161 is a dichroic mirror, but the present disclosure is not limited in this regard. In some embodiments, the second light guiding member 162 is a reflective mirror, but the present disclosure is not limited in this regard.

In some embodiments, a plurality of laser light sources can be symmetrically arranged along the second axis D2 with the second laser light source 122 as the center (as shown in FIG. 1, there are laser light sources respectively on the upper and lower sides of the second laser light source 122). These laser light sources and the second laser light source 122 emit light beams toward the wavelength conversion unit 130 along the first axis D1 to obtain more color light, and the central optical axis of the overall color light is still the second central optical axis A2.

Since the first laser light source 121 and the second laser light source 122 are separated by a distance on the second axis D2, the receiving of light of the light combining member 150 and the uniformity of the light at the rear end will be affected by the distance. Therefore, making the optical axes of the first laser light source 121 and the second laser light source 122 coincide before entering the light combining member 150 is helpful for the uniformity of the light. A specific method of making the optical axes coincide is to guide a light beam to travel to the position of the light combining member 150 by a light guiding member, and another light guiding member is disposed on the traveling path and guides another light beam to also travel toward the light combining member 150. For this embodiment, the second light guiding member 162 guides the color light converted from the second light beam B2 to travel to the position of the light combining member 150, while the first light guiding member 161 is disposed on the above-mentioned traveling path and guides the first light beam B1 to the position of the light combining member 150. The color light converted from the second light beam B2 passes through the first light guiding member 161. By adjusting the reflection angle of the first light guiding member 161, the first central optical axis A1 and the second central optical axis A2 can substantially coincide. With the foregoing configurations, the light source device 100 of the present embodiment can omit the conventional fluorescent wheel, thus has a smaller volume and can avoid vibration, noise, and other unstable factors caused by the fluorescent wheel. Not only that, the light source device 100 of the present embodiment can also avoid using high-priced red laser light sources and green laser light sources, thereby reducing costs.

Figure 2:
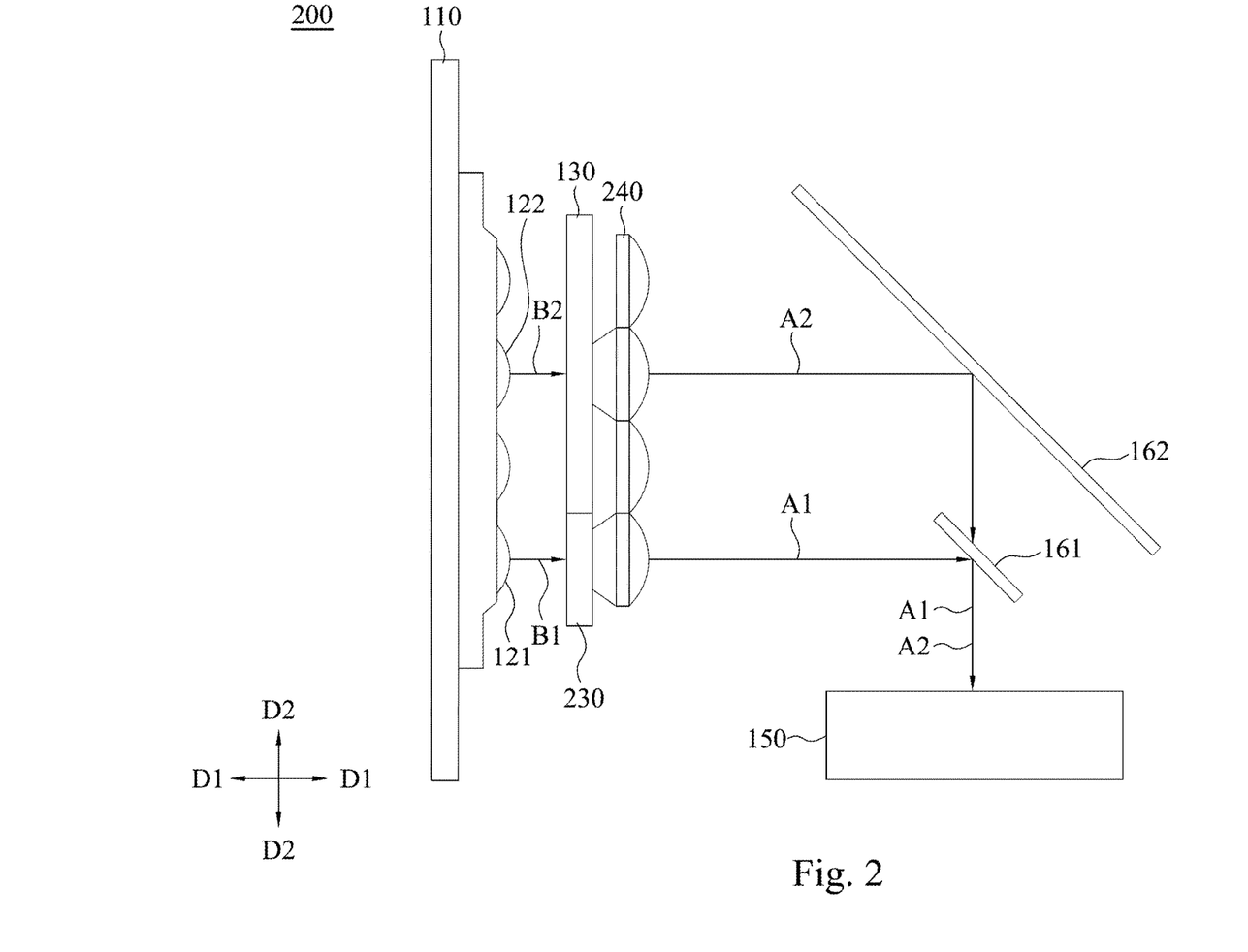
FIG. 2 is a schematic diagram of a light source device according to another embodiment of the present disclosure.

Reference is made to FIG. 2. FIG. 2 is a schematic diagram of a light source device 200 according to another embodiment of the present disclosure. As shown in FIG. 2, in the present embodiment, the light source device 200 includes a circuit board 110, a plurality of laser light sources, a wavelength conversion unit 130, a light condensing module 240, a light combining member 150, and a plurality of light guiding members, in which the circuit board 110, the laser light sources, the wavelength conversion unit 130, the light combining member 150, and the light guiding members are identical to those in the embodiments shown in FIG. 1, so the above related introductions can be referred and will not be repeated here.

Compared with the embodiment shown in FIG. 1, the light source device 200 of the present embodiment further includes a diffusion sheet 230, and the number of condensing lenses included in the light condensing module 240 is larger. Specifically, the first laser light source 121 is configured to emit the first light beam B1 toward the diffusion sheet 230 to increase the uniformity of the color light of the first light beam B1. In addition, the light condensing module 240 includes a condensing lens corresponding to the first light beam B1, so as to condense the color light diverged by the first light beam B1 by the diffusion sheet 230, thereby reducing light loss.

Figure 3:
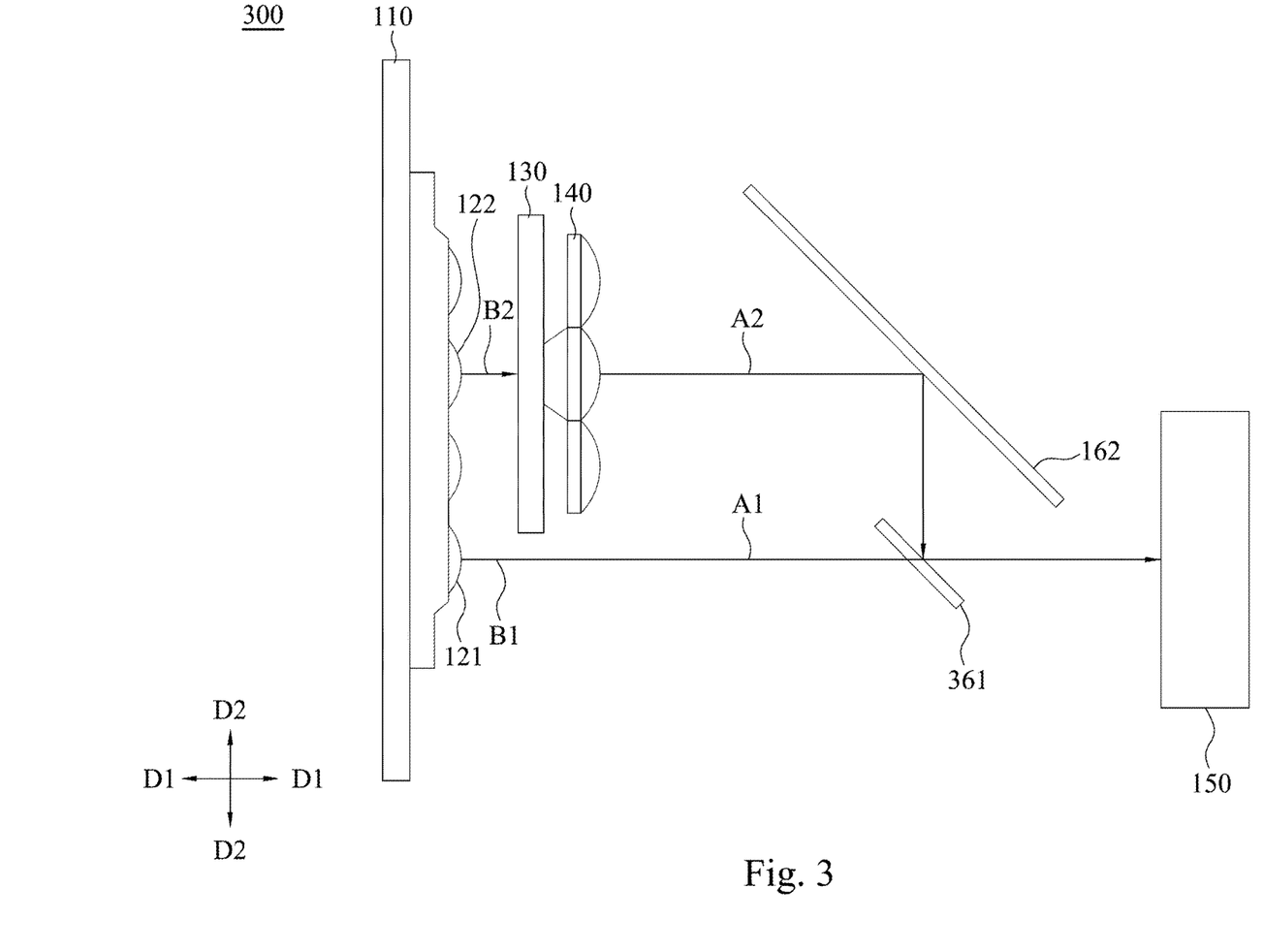
FIG. 3 is a schematic diagram of a light source device according to another embodiment of the present disclosure.

Reference is made to FIG. 3. FIG. 3 is a schematic diagram of a light source device 300 according to another embodiment of the present disclosure. As shown in FIG. 3, in the present embodiment, the light source device 300 includes a circuit board 110, a plurality of laser light sources, a wavelength conversion unit 130, a light condensing module 140, a light combining member 150, a first light guiding member 361, and a second light guiding member 162, in which the circuit board 110, the laser light sources, the wavelength conversion unit 130, light condensing module 140, the light combining member 150, and the second light guiding member 162 are identical to those in the embodiments shown in FIG. 1, so the above related introductions can be referred and will not be repeated here.

Compared with the embodiment shown in FIG. 1, the present embodiment provides the modified first light guiding member 361. Specifically, the first light guiding member 361 of the present embodiment is configured to guide the color light from the first light guiding member 361 to the light combining member 150, and is configured to allow the first light beam B1 to pass through. It can be seen that the second light guiding member 162 and the first light guiding member 361 in the present embodiment are configured to sequentially guide the color light to the light combining member 150 without guiding the first light beam B1.

In practical applications, it is also possible to design and configure the light guiding members to sequentially guide the first light beam B1 to the light combining member 150 without guiding the color light.

Figure 4:
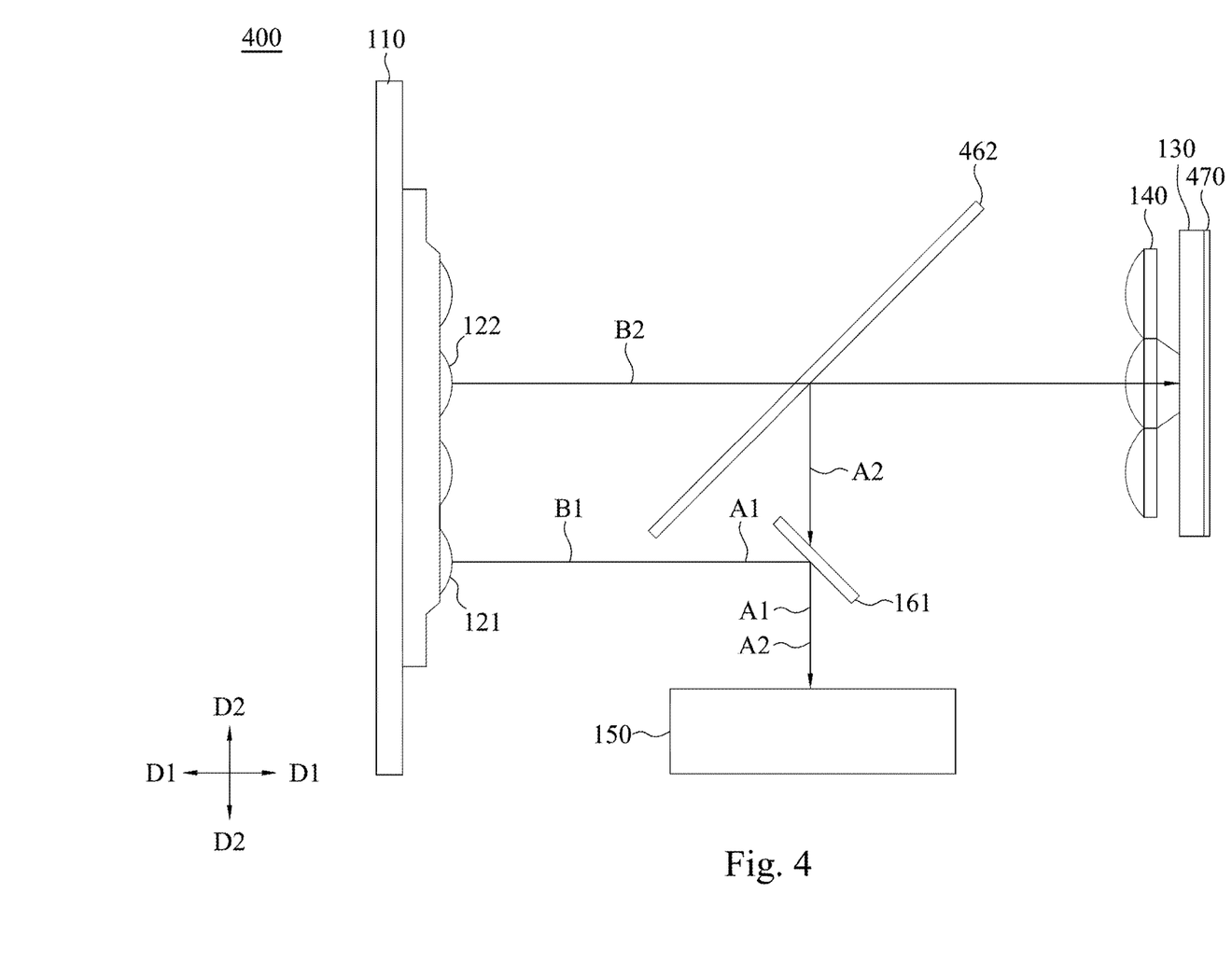
FIG. 4 is a schematic diagram of a light source device according to another embodiment of the present disclosure.

Reference is made to FIG. 4. FIG. 4 is a schematic diagram of a light source device 400 according to another embodiment of the present disclosure. As shown in FIG. 4, in the present embodiment, the light source device 400 includes a circuit board 110, a plurality of laser light sources, a wavelength conversion unit 130, a light condensing module 140, a light combining member 150, a first light guiding member 161, and a second light guiding member 462, in which the circuit board 110, the laser light sources, the wavelength conversion unit 130, light condensing module 140, the light combining member 150, and the first light guiding member 161 are identical to those in the embodiments shown in FIG. 1, so the above related introductions can be referred and will not be repeated here.

Compared with the embodiment shown in FIG. 1, the second laser light source 122 of the present embodiment is configured to emit the second light beam B2 toward a side of the wavelength conversion unit 130 (for example, the left side of the wavelength conversion unit 130 in FIG. 4), and the converted color light propagates away from the wavelength conversion unit 130 from the side of the wavelength conversion unit 130. In order to achieve the aforementioned purpose, the light source device 400 of the present embodiment further includes a light reflecting member 470 disposed on another side of the wavelength conversion unit 130 (e.g., the right side of the wavelength conversion unit 130 in FIG. 4). In some embodiments, the light reflecting member 470 is a reflective coating disposed on the another side of the wavelength conversion unit 130. In some embodiments, the light reflecting member 470 is a reflective substrate, and the wavelength conversion unit 130 contacts the reflective substrate with the another side.

In addition, the light condensing module 140 is located between the second laser light source 122 and the wavelength conversion unit 130, and the second light guiding member 462 is located between the second laser light source 122 and the light condensing module 140. The second light guiding member 462 is configured to allow the second light beam B2 to pass through. The second light guiding member 462 is configured to guide the color light converted from the second light beam B2 by the wavelength conversion unit 130 to the first light guiding member 161. The first central optical axis A1 and the second central optical axis A2 coincide after passing through the first light guiding member 161.

Figure 5:
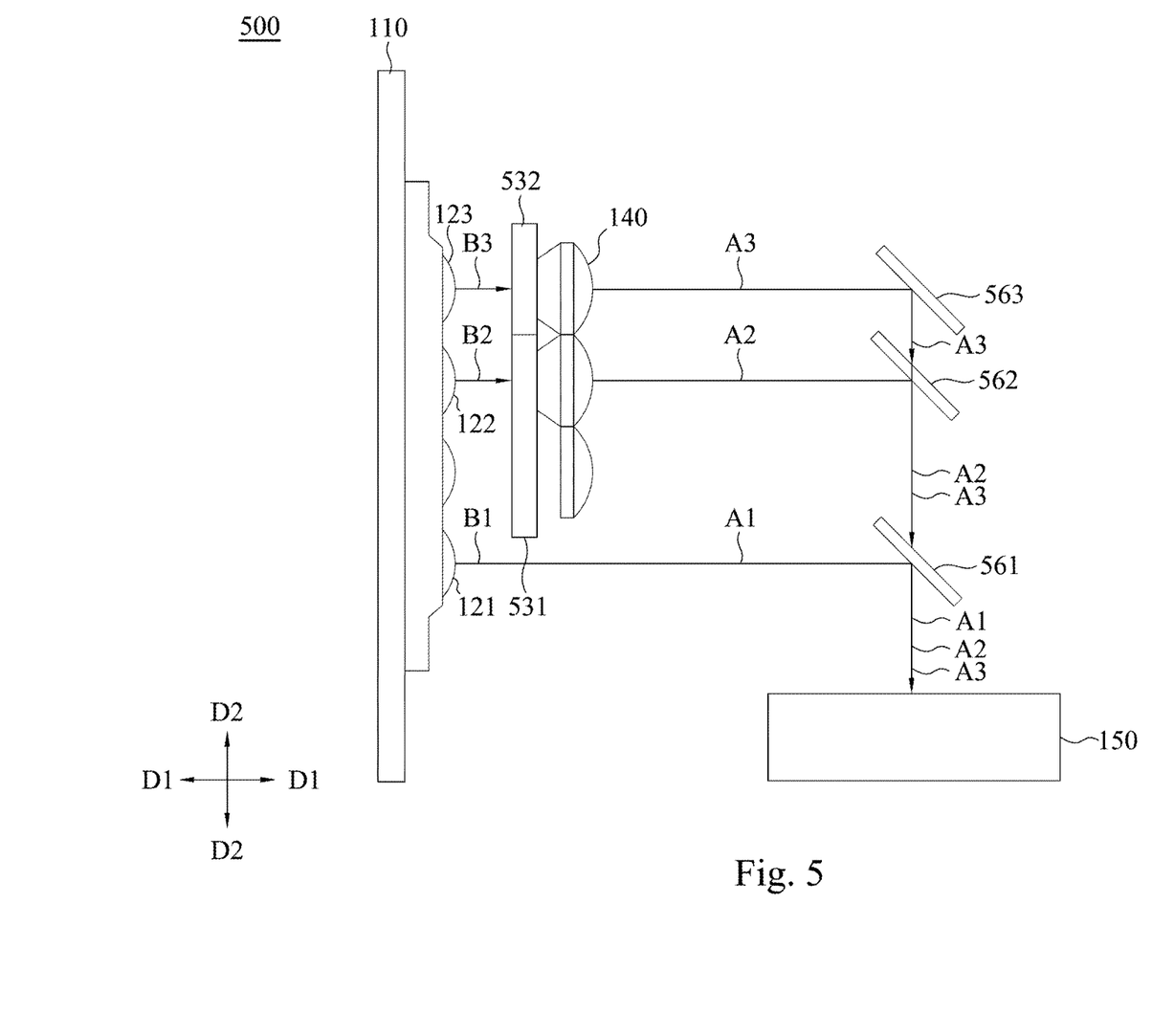
FIG. 5 is a schematic diagram of a light source device according to another embodiment of the present disclosure.

Reference is made to FIG. 5. FIG. 5 is a schematic diagram of a light source device 500 according to another embodiment of the present disclosure. As shown in FIG. 5, in the present embodiment, the light source device 500 includes a circuit board 110, a plurality of laser light sources, a light condensing module 140, and a light combining member 150, in which these components are identical to those in the embodiments shown in FIG. 1, so the above related introductions can be referred and will not be repeated here.

Compared with the embodiment shown in FIG. 1, the light source device 500 of the present embodiment further includes a third laser light source 123, a wavelength conversion unit 532, and a third light guiding member 563. A modified wavelength conversion unit 531 and a second light guiding member 562 are provided by the light source device 500. The third laser light source 123 is arranged along the second axis D2 with the first laser light source 121. The third laser light source 123 is configured to emit a third light beam B3 along the first axis D1. The wavelength conversion unit 532 is configured to convert the third light beam B3 into another color light. The light condensing module 140 is further configured to condense the another color light, so that the condensed another color light has a third central optical axis A3. The first light guiding member 561, the second light guiding member 562, and the third light guiding member 563 are respectively configured to guide the first light beam B1, the color light converted from the second light beam B2, and the another color light converted from the third light beam B3, so that the first central optical axis A1, the second central optical axis A2, and the third central optical axis A3 coincide before the first light beam B1, the color light, and the another color light reach the light combining member 150.

In some embodiments, the first light beam B1, the second light beam B2, and the third light beam B3 are blue laser beams. The first light beam B1 is emitted by the first laser light source 121, the second light beam B2 is emitted by the second laser light source 122, and the third light beam B3 is emitted by the third laser light source 123. The color light which is converted from the second light beam B2 by the wavelength conversion unit 531 is red light, and the color light which is converted from the third light beam B3 by the wavelength conversion unit 532 is green light, but the present disclosure is not limited in this regard.

As shown in FIG. 5, in the present embodiment, the third light guiding member 563 is configured to guide the color light which is converted from the third light beam B3 to the second light guiding member 562. The second light guiding member 562 is configured to guide the color light which is converted from the second light beam B2 to the first light guiding member 561 and further configured to allow the color light which is converted from the third light beam B3 to pass through. The first light guiding member 561 is further configured to allow the color light which is converted from the second light beam B2 and the color light which is converted from the third light beam B3 to pass through. The first central optical axis A1, the second central optical axis A2, and the third central optical axis A3 coincide after passing through the first light guiding member 561.

In some embodiments, the first light guiding member 561 and the second light guiding member 562 are dichroic mirrors, but the present disclosure is not limited in this regard. In some embodiments, the third light guiding member 563 is a reflective mirror, but the present disclosure is not limited in this regard.

Figure 6:
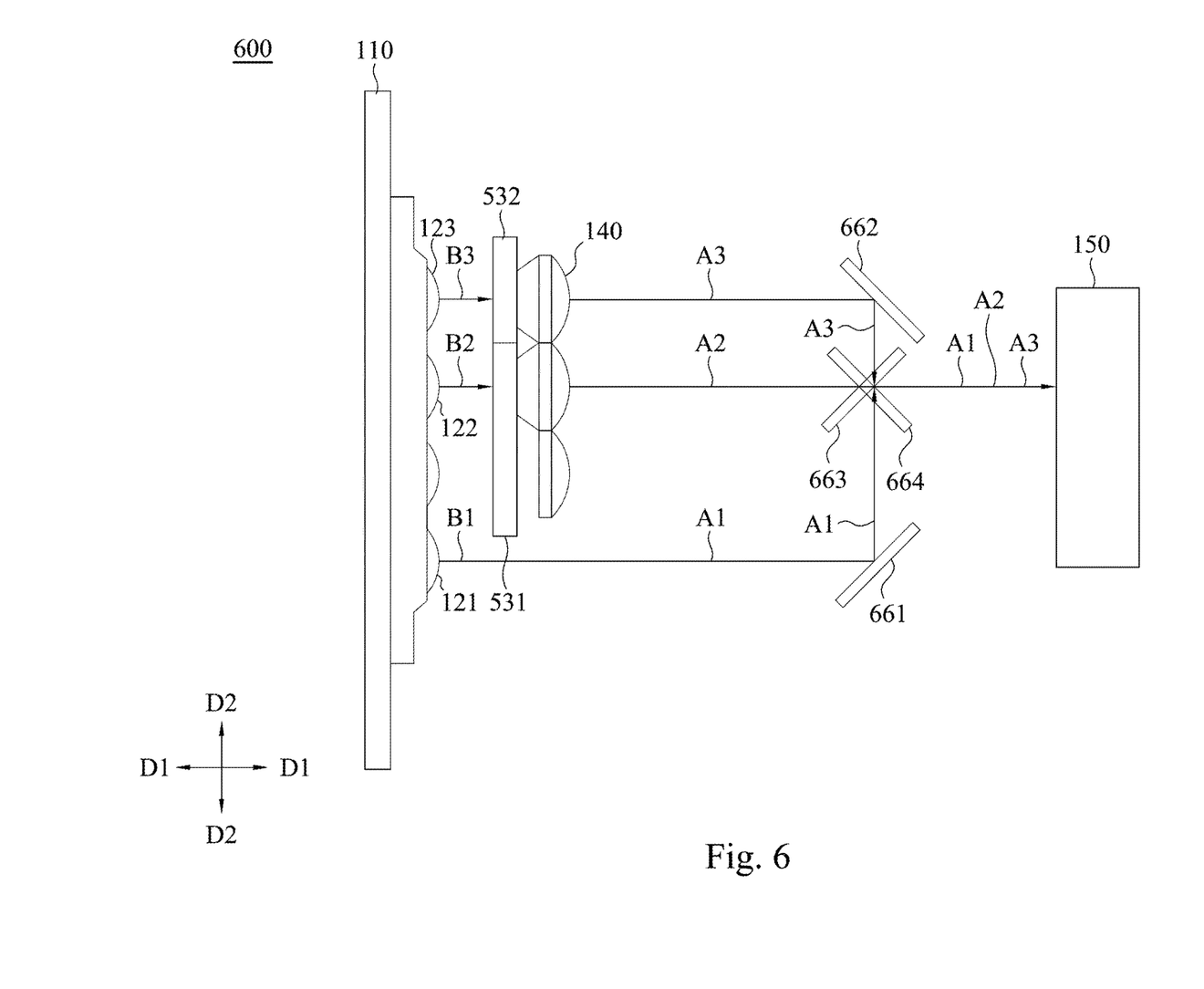
FIG. 6 is a schematic diagram of a light source device according to another embodiment of the present disclosure.

Reference is made to FIG. 6. FIG. 6 is a schematic diagram of a light source device 600 according to another embodiment of the present disclosure. As shown in FIG. 6, in the present embodiment, the light source device 600 includes a circuit board 110, a plurality of laser light sources, wavelength conversion units 531, 532, a light condensing module 140, and a light combining member 150, in which these components are identical to those in the embodiments shown in FIG. 5, so the above related introductions can be referred and will not be repeated here.

Compared with the embodiment shown in FIG. 5, the light guiding members of the present embodiment further includes a third light guiding member 663 and a fourth light guiding member 664. A first light guiding member 661 and a second light guiding member 662 which are modified are provided. Specifically, in the present embodiment, the first light guiding member 661 and the third light guiding member 663 are configured to guide the first light beam B1 sequentially. The second light guiding member 662 and the fourth light guiding member 664 are configured to guide the color light converted from the third light beam B3 sequentially. The third light guiding member 663 and the fourth light guiding member 664 are further configured to allow the color light which is converted from the second light beam B2 to pass through.

In some embodiments, the third light guiding member 663 and the fourth light guiding member 664 are dichroic mirrors, but the present disclosure is not limited in this regard. In some embodiments, the first light guiding member 661 and the second light guiding member 662 are reflective mirrors, but the present disclosure is not limited in this regard.

It should be noted that the transmission and reflection characteristics of each light guiding member are not limited to the embodiments shown in FIGS. 5 and 6, as long as it is configured so that the first central optical axis A1, the second central optical axis A2, and the third central optical axis A3 coincide before the first light beam B1, the color light which is converted from the second light beam B2, and the color light which is converted from the third light beam B3 reach the light combining member 150.

Figure 7:
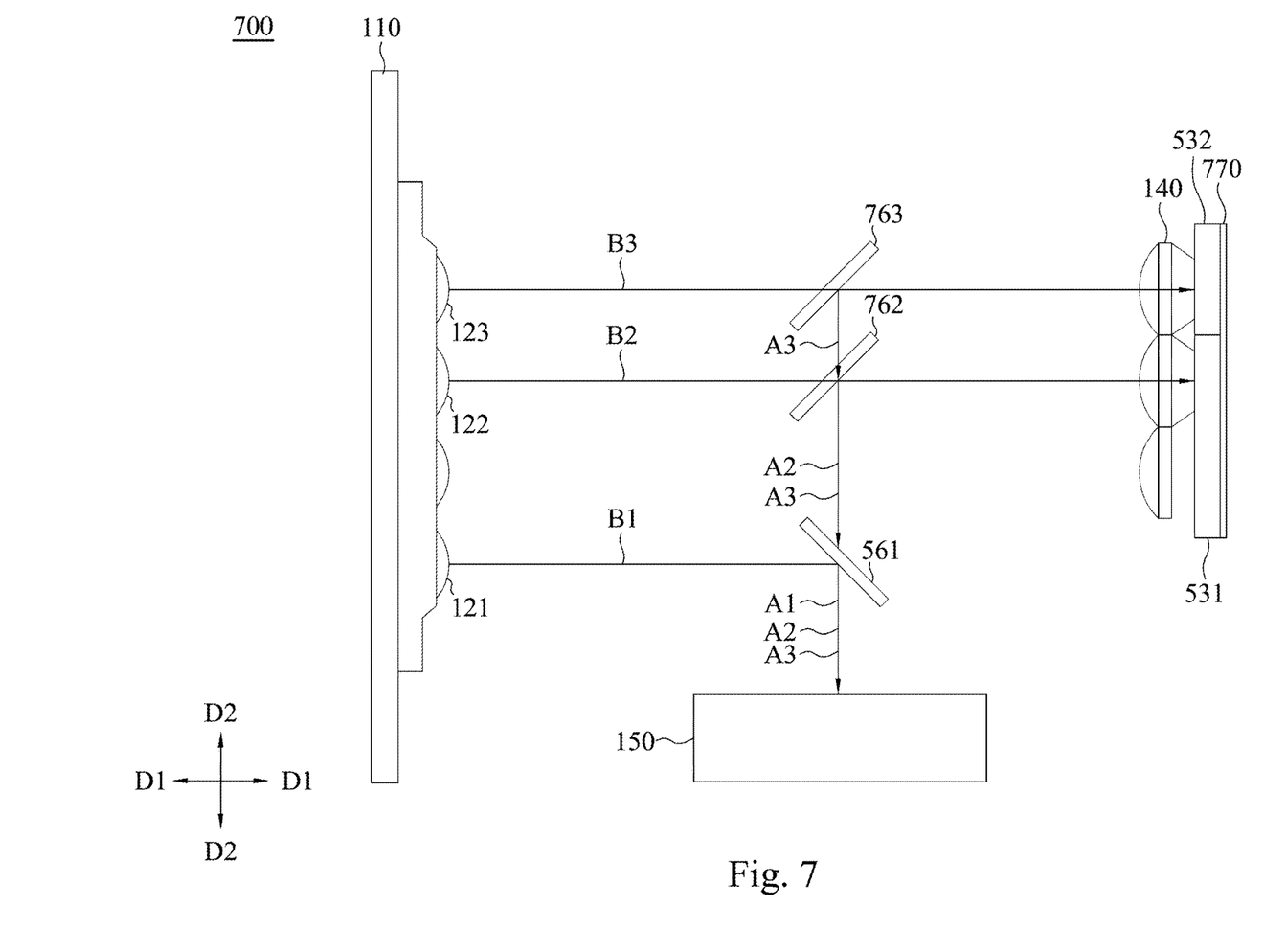
FIG. 7 is a schematic diagram of a light source device according to another embodiment of the present disclosure.

Reference is made to FIG. 7. FIG. 7 is a schematic diagram of a light source device 700 according to another embodiment of the present disclosure. As shown in FIG. 7, in the present embodiment, the light source device 700 includes a circuit board 110, a plurality of laser light sources, wavelength conversion units 531, 532, a light condensing module 140, a light combining member 150, a first light guiding member 561, a second light guiding member 762, and a third light guiding member 763, in which the circuit board 110, the laser light sources, the wavelength conversion units 531, 532, the light condensing module 140, the light combining member 150, and the first light guiding member 561 are identical to those in the embodiments shown in FIG. 5, so the above related introductions can be referred and will not be repeated here.

Compared with the embodiment shown in FIG. 5, the second laser light source 122 and the third laser light source 123 of the present embodiment are respectively configured to emit the second light beam B2 and the third light beam B3 toward a side of the wavelength conversion units 531, 532 (e.g., the left side of the wavelength conversion units 531, 532 in FIG. 7), and the converted color lights propagate away from the wavelength conversion units 531, 532 from the side of the wavelength conversion units 531, 532. In order to achieve the aforementioned purpose, the light source device 700 of the present embodiment further includes a light reflecting member 770 disposed on another side of the wavelength conversion units 531, 532 (e.g., the right side of the wavelength conversion units 531, 532 in FIG. 7). In some embodiments, the light reflecting member 770 is a reflective coating disposed on the another side of the wavelength conversion units 531, 532. In some embodiments, the light reflecting member 770 is a reflective substrate, and the wavelength conversion units 531, 532 contact the reflective substrate with the another side.

In addition, the light condensing module 140 is located between the second laser light source 122 and the wavelength conversion unit 531, and the second light guiding member 762 is located between the second laser light source 122 and the light condensing module 140. The light condensing module 140 is located between the third laser light source 123 and the wavelength conversion unit 532, and the third light guiding member 763 is located between the third laser light source 123 and the light condensing module 140. The third light guiding member 763 is configured to allow the third light beam B3 to pass through, and is configured to guide the color light converted from the third light beam B3 by the wavelength conversion unit 532 to the second light guiding member 762. The second light guiding member 762 is configured to allow the second light beam B2 and the color light converted from the third light beam B3 by the wavelength conversion unit 532 to pass through, and is configured to guide the color light which is converted from the second light beam B2 by the wavelength conversion unit 531 to the first light guiding member 561. The first central optical axis A1 and the second central optical axis A2 coincide after passing through the first light guiding member 561.

According to the foregoing recitations of the embodiments of the disclosure, it can be seen that in the light source device of the present disclosure, the first light beam which is emitted by the first laser light source does not pass through the wavelength conversion unit. The second light beam which is emitted by the second laser light source passes through the wavelength conversion unit to be converted into color light. Then, the diffused color light is condensed by the light condensing module, and the first light beam and the color light are combined by the light combining member to obtain the white light. In this way, the light source device of the present disclosure can omit the conventional fluorescent wheel, thus has a smaller volume and can avoid vibration, noise, and other unstable factors caused by the fluorescent wheel. Not only that, the light source device of the present disclosure can also avoid using high-priced red laser light sources and green laser light sources, thereby reducing costs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light source device, comprising:
   a first laser light source configured to emit a first light beam along a first axis, wherein the first light beam has a first central optical axis;
   a second laser light source arranged along a second axis with the first laser light source and configured to emit a second light beam along the first axis;
   a first wavelength conversion unit configured to convert the second light beam into a color light;
   a light condensing module configured to condense the color light, wherein the color light which is condensed has a second central optical axis;
   a light combining member configured to receive the first light beam and the color light; and
   a plurality of light guiding members configured to guide at least one of the first light beam and the color light, so that the first central optical axis and the second central optical axis coincide before the first light beam and the color light reach the light combining member.

2. The light source device of claim 1, wherein the first laser light source and the second laser light source are disposed on a circuit board and electrically connected to the circuit board.

3. The light source device of claim 1, wherein the light guiding members comprises a first light guiding member and a second light guiding member, and the first light guiding member and the second light guiding member are configured to sequentially guide one of the first light beam and the color light.

4. The light source device of claim 3, wherein the second light guiding member is configured to allow another of the first light beam and the color light to pass through, and the first central optical axis and the second central optical axis coincide after passing through the second light guiding member.

5. The light source device of claim 1, wherein the light guiding members comprises a first light guiding member and a second light guiding member, the first light guiding member is configured to guide the first light beam, and the second light guiding member is configured to guide the color light.

6. The light source device of claim 5, wherein the second light guiding member is configured to guide the color light to the first light guiding member, the first light guiding member is further configured to allow the color light to pass through, and the first central optical axis and the second central optical axis coincide after passing through the first light guiding member.

7. The light source device of claim 5, wherein the light guiding members further comprises a third light guiding member and a fourth light guiding member, the third light guiding member is configured to guide the first light beam from the first light guiding member, the fourth light guiding member is configured to guide the color light from the second light guiding member, and the first central optical axis and the second central optical axis coincide after respectively passing through the third light guiding member and the fourth light guiding member.

8. The light source device of claim 1, further comprising:
   a third laser light source arranged along the second axis with the first laser light source and configured to emit a third light beam along the first axis; and
   a second wavelength conversion unit configured to convert the third light beam into another color light,
   wherein the light condensing module is further configured to condense the another color light, so that the another color light which is condensed has a third central optical axis,
   wherein the light guiding members are configured to guide at least two of the first light beam, the color light, and the another color light, so that the first central optical axis, the second central optical axis, and the third central optical axis coincide before the first light beam, the color light, and the another color light reach the light combining member.

9. The light source device of claim 8, wherein the first laser light source, the second laser light source, and the third laser light source are disposed on a circuit board and electrically connected to the circuit board.

10. The light source device of claim 8, wherein the light guiding members comprises a first light guiding member, a second light guiding member, and a third light guiding member that are respectively configured to guide the first light beam, the color light, and the another color light.

11. The light source device of claim 10, wherein the third light guiding member is configured to guide the another color light to the second light guiding member, the second light guiding member is configured to guide the color light to the first light guiding member and further configured to allow the another color light to pass through, the first light guiding member is further configured to allow the color light and the another color light to pass through, and the first central optical axis, the second central optical axis, and the third central optical axis coincide after passing through the first light guiding member.

12. The light source device of claim 8, wherein the light guiding members comprises a first light guiding member, a second light guiding member, a third light guiding member, and a fourth light guiding member, the first light guiding member and the third light guiding member are configured to sequentially guide a first one of the first light beam, the color light, and the another color light, the second light guiding member and the fourth light guiding member are configured to sequentially guide a second one of the first light beam, the color light, and the another color light, and the third light guiding member and the fourth light guiding member are further configured to allow a third one of the first light beam, the color light, and the another color light to pass through.

13. The light source device of claim 8, wherein the first laser light source, the second laser light source, and the third laser light source are blue laser light sources.

14. The light source device of claim 1, wherein the second laser light source is configured to emit the second light beam toward a side of the first wavelength conversion unit, and the color light propagates away from the first wavelength conversion unit from another side of the first wavelength conversion unit.

15. The light source device of claim 14, wherein the first wavelength conversion unit is located between the second laser light source and the light condensing module.

16. The light source device of claim 1, wherein the second laser light source is configured to emit the second light beam toward a side of the first wavelength conversion unit, and the color light propagates away from the first wavelength conversion unit from the side of the first wavelength conversion unit.

17. The light source device of claim 16, wherein the light condensing module is located between the second laser light source and the first wavelength conversion unit.

18. The light source device of claim 16, further comprising a light reflecting member which is disposed at another side of the first wavelength conversion unit.

19. The light source device of claim 1, further comprising a diffusion sheet, wherein the first laser light source is configured to emit the first light beam toward the diffusion sheet.

20. The light source device of claim 1, wherein the first laser light source and the second laser light source are blue laser light sources.

* * * * *